JOHN T. RODGERS
RICHARD M. WILLIAMS
RICHARD J. LARSEN
INVENTORS

WHANN & McMANIGAL
Attorneys for Applicants

BY Robert M. McManigal

United States Patent Office 3,725,110
Patented Apr. 3, 1973

3,725,110
PROCESS OF COATING ARTICLES WITH PYROLYTIC GRAPHITE AND COATED ARTICLES MADE IN ACCORDANCE WITH THE PROCESS
John T. Rodgers, Long Beach, Richard M. Williams, Montclair, and Richard J. Larsen, Alhambra, Calif., assignors to Ducommun Incorporated, Vernon, Calif.
Continuation of abandoned application Ser. No. 559,781, June 23, 1966. This application Nov. 13, 1969, Ser. No. 871,761
Int. Cl. C23c 11/00, 11/10; C01b 31/07
U.S. Cl. 117—46 CG          5 Claims

ABSTRACT OF THE DISCLOSURE

A process of producing a pyrolytic graphite coating on a substrate which will not peel off, said coating being deposited in a two (2) step process wherein first there is deposited a coating of pyrolytic graphite or pyrolytic carbon at temperatures of between 900° and 1350° C. and subsequently depositing a second pyrolytic graphite coating at temperatures between 1500° and 1900° C. The pyrolytic graphite or pyrolytic carbon coated product is produced by the above process.

---

Figure 1:
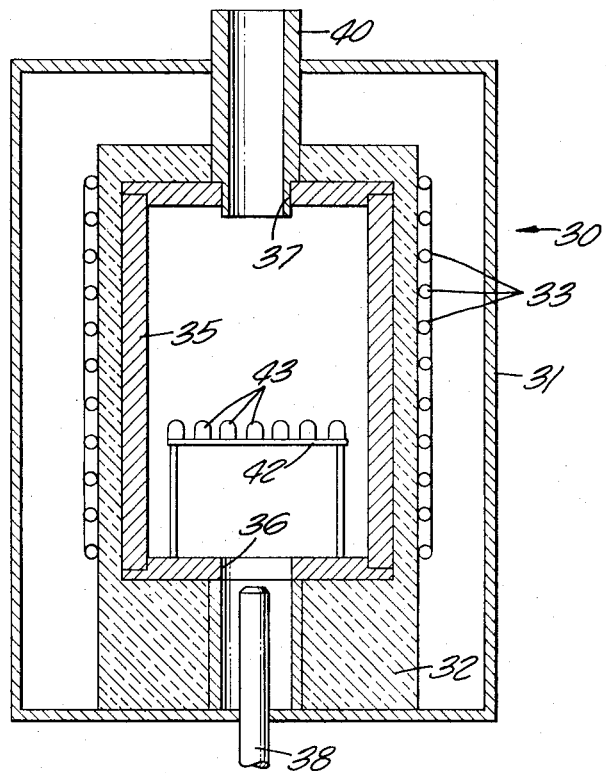

This is a continuation of application Ser. No. 559,781, filed June 23, 1966, now abandoned.

This invention relates generally to a process of coating articles with pyrolytic graphite, and particularly relates to an improved process of providing a relatively thin pyrolytic graphite coating on a substrate, and coated articles made in accordance with the process.

It is known to provide free-standing articles made entirely of pyrolytic graphite. However, for some purposes it is desirable to coat a suitable substrate with a relatively thin coating of pyrolytic graphite. Such coated articles have less weight than an article made entirely with pyrolytic graphite. Also less time and equipment is required to deposit a thin coating rather than to make a free standing relatively thick article of pyrolytic graphite.

Pyrolytic graphite consits of pure carbon and is usually deposited from a carbonaceous gas such as methane ($CH_4$) at elevated temperatures. It has unusual physical properties such as being anisotropic and is capable of withstanding temperatures of the order of 300° F. (Fahrenheit) or more.

Pyrolytic graphite is generally deposited in random layers which are disposed like a disarranged stack of cards or laminae. Accordingly, the pyrolytic graphite has highly anisotropic characteristics. Its mechanical, thermal and electrical properties depend on the direction. It has become conventional practice to define as the $a$–$b$ direction the plane at which the graphite is deposited, and the $c$ direction at right angles to this plane. For example, pyrolytic graphite conducts heat very well in the $a$–$b$ plane, but is highly heat insulating in the $c$ direction.

A substrate to be coated with pyrolytic graphite may consist of a porous material capable of withstanding elevated temperatures, that is, the temperatures at which the pyrolytic graphite is deposited or used. Such a substrate may, for example, consist of ordinary graphite or else of porous ceramics.

It has been found that if a thin coating of pyrolytic graphite is deposited on such a porous substrate, the coating will peel off or will delaminate due to the differences of the coefficients of expansion of pyrolytic graphite and ordinary graphite, particularly at elevated temperatures.

It is, accordingly, an object of the present invention to provide a novel process of depositing a relatively thin layer of pyrolytic graphite on a porous substrate in such a manner that the coating will not peel off, and articles made in accordance with the process.

A further object of the present invention is to coat a porous substrate, such as ordinary graphite, with a smooth dense coating of pyrolytic graphite which is substantially impervious to gases and liquids and to provide such improved coated articles.

Still another object of the present invention is to provide a process of coating a porous substrate such as ordinary graphite with pyrolytic graphite in such a manner as to create a gradual transition between the physical properties of ordinary graphite and those of pyrolytic graphite, and a coated article made in accordance with the process.

Thus, in accordance with the present invention, a substrate consisting of a porous material such as graphite is coated with pyrolytic graphite by initially heating the substrate to a temperature range between approximately 900° C. (Centigrade) and approximately 1350° C., while flowing a carbonaceous material over the substrate. Preferably, this carbonaceous material consists of methane ($CH_4$). This is flowed over the substrate for a period of time sufficient to infiltrate the substrate with pyrolytic graphite and to close the voids of the substrate.

Thereafter, the substrate is heated to a temperature range between approximately 1500° C. and approximately 1900° C., while simultaneously flowing carbonaceous material over the substrate. This is done for a period of time sufficient to provide a coating of pyrolytic graphite of the desired thickness. This will create a strong and intimate bond between the substrate and the pyrolytic graphite coating.

The invention also includes an article coated in accordance with the process of the present invention.

Figure 2:
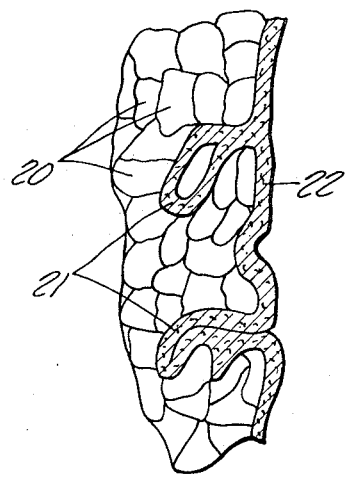

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, wherein:

FIG. 1 is a schematic cross-section view of a vacuum furnace which may be used for practising the process of the present invention; and FIG. 2 is a sectional view on greatly enlarged scale illustrating the microstructure of a coated article embodying the present invention and having grains of ordinary graphite infiltrated with and coated by pyrolytic graphite.

Referring now to the drawings, and particularly to FIG. 1, there is illustrated an electric vacuum furnace which may be used for carrying out the process of the present invention.

This vacuum furnace, generally indicated at 30, has an outer container 31 within which is disposed a cylindrical body 32 of suitable heat insulating material. The insulating cylinder 32 may be surrounded by a heating coil 33 for electrically heating the insulating cylinder 32 and the material disposed within. A container 35 may be fitted within the insulating cylinder 32 and provided with a suitable inlet opening 36 and an outlet opening 37. A tube 38 may extend through the outer container 31 and the insulating cylinder 32 to feed a suitable gas into the vacuum furnace. This is preferably a carbonaceous gas such as methane ($CH_4$).

There may also be provided an exhaust stack 40 which also extends through the inner container 35, the heat insulating cylinder 32 and the outer container 31. This permits evacuation of the furnace and the removal of gases formed during the thermal decomposition of the carbonaceous gas fed into the furnace. There may also be arranged a stand 42 within the inner container 35 on which suitable substrates 43 may be disposed which are to be coated. It will be understood that the substrates 43 are shown schematically and have a shape corresponding to that of the articles desired.

The electric furnace 30 is preferably arranged to be evacuated so that the deposition process may take place at a reduced pressure. It should be noted that the furnace should consist of materials which are capable of withstanding temperatures in excess of 2400° C. Such materials may, for example, consist of ordinary graphite or suitable ceramics.

In order to make the desired article the substrate, which may consist of a porous ceramic or preferably of ordinary graphite, is first machined into suitable form and loaded into the furnace as shown at 43. The substrate 43 are preferably placed into the furnace chamber in a manner so as to take maximum advantages of the flow of the gas.

After the chamber has been loaded with the substrates 43 to be coated, the pressure in the furnace is preferably reduced to a range from between 1 mm. to 350 mm. of mercury. Then the temperature of the chamber and of the substrates is elevated from ambient temperature to a temperature range of between 1950° C. and about 2400° C. After the desired temperature within the chamber has been reached, the furnace is held at this temperature from between half an hour to half a day.

The purpose of this heating is to bake out impurities in the graphite substrates before they are coated. Ordinary graphite is porous and, hence, tends to adsorb gases and other impurities which are preferably baked out. However, it should be noted that the baking-out process is not necessary to the practice of the process of the present invention.

After the impurities and adsorbed gases have been baked out, the temperature is then reduced to a range from about 900° C. to about 1350° C. If the initial heating step is omitted, the furnace is initially heated to a temperature between 900° C. and 1350° C. The pressure may be between about 0.5 mm. and about 350 mm. of mercury.

After the proper temperature has been reached, the pores or voids of the substrates are now infiltrated with pyrolytic graphite. To this end a suitable carbonaceous gas is flowed into the furnace. Preferably methane is used at a flow rate of say between about 0.1 cubic foot per hour and about 150 cubic feet per hour. It will be understood that the furnace is being pumped out to maintain the pressure within the selected pressure range.

The infiltration or coating of the internal pores of the substrate is carried out for a period of time between half an hour and two days. The period of time necessary will depend on various conditions such as the type of graphite used for the substrate as well as on the flow rate of the methane and the pressure that is being maintained. In any case, the methane undergoes a thermal decomposition, and free carbon atoms are formed as well as hydrogen gas which is removed. The free carbon atoms penetrate the voids in the graphite substrate and adhere thereto to form a tight mechanical bond. As explained before, this bond is facilitated by the prior outgassing of the graphite substrate. It will be understood that the degree and depth of the infiltration depends on the time of coating, on the gas flow, the temperature, the pressure within the furnace as well as on the grade or type of graphite which is used.

After the substrate has been infiltrated in the manner just disclosed, there is created a transition zone at the surface of the substrate. This transition zone provides a graded structure which changes from pyrolytic carbon to pyrolytic graphite. Hence this transition zone is created before the coating is applied to the substrate.

After the graphite has been infiltrated in the manner described, the temperature is then raised again to a range between about 1500° C. and about 1900° C. Now, the previously infiltrated graphite, the pores or voids of which have been closed, is provided with an outer coating of a desired thickness. The coating may have a thickness of between 0.5 mil and 15 mils, but different thicknesses may be used depending on the final use of the finished article. To this end, the gas flow is again maintained within the previous range, that is, from 0.5 cubic foot per hour to 150 cubic feet per hour of methane. The pressure is again maintained in the same range, that is, from 0.5 to 350 mm. of mercury.

After these conditions have been reached, the coating of the substrate will continue for a period of time from approximately ¼ hour to half a day. Again the period of time depends on the thickness of the coating desired as well as on the other variable previously referred to. Now, a uniform coating of pyrolytic graphite is provided over the infiltrated substrate.

Thus, the gradual transition zone exists between ordinary graphite or pyrolytic carbon and pyrolytic graphite due to the infiltration process. This transition zone is created because for the coating step the temperature is raised from the infiltration step and the pressure may also be raised, although it may remain the same. After the desired thickness of the coating has been obtained, the gas flow is turned off and the chamber and coated articles are allowed to cool to ambient temperature and the pressure is raised to ambient. It should be particularly noted that no further machining or finishing of the coated articles is necessary. It is, of course, well known that pyrolytic graphite deposits in a dense, smooth layer which does not require finishing.

The finished article in accordance with the present invention is illustrated in FIG. 2 to which reference is now made. As shown there, 20 indicates individual, unoriented grains or small particles of normal or ordinary graphite. Pores or voids are formed between the grains 20 of graphite. These are filled in adjacent the outer surface, as shown at 21, by a deposit of pyrolytic graphite or carbon, as the case may be, infiltrated into the voids. Eventually, an outer coating 22 is provided which has a smooth surface layer. This surface layer is substantially impervious to most liquids and gases and in particular is impervious to water and water vapor.

Thus, it will be seen that a gradual transition zone is created between the graphite grains 20 and the outer pyrolytic graphite layer 22 before the coating is applied. Accordingly the coating 22 is not liable to delaminate or to peel off.

It will be appreciated that the production costs for a coated article embodying the present invention are greatly reduced compared to those of a solid or free-standing pyrolytic graphite article. No machining is required to finish the insert. Rejects are very much reduced for such defects as spalling, delamination, soot or nodules. The furnace time is greatly reduced as well as the requirements for furnace space. It will also be appreciated that there is no need to deposit large amounts of excess graphite.

It should be noted that the above described deposition process will result in the laminae of the pyrolytic graphite being deposited parallel to the surface. In other words, the $a$–$b$ plane of the pyrolytic graphite is parallel to the surface.

A coated article in accordance with the present invention may be used, for example, for vacuum equipment, that is, for a vacuum furnace of the type illustrated in FIG. 1. The pyrolytic graphite coated articles may also be used for boats or crucibles for melting high temperature compounds or chemical elements and may be used in particular for the growing of crystals such as practised in the semiconductor art. Thus, pyrolytic graphite coated crucibles are suitable for the growing of silicon or germanium crystals. In addition, a pyrolytic graphite coated article in accordance with the invention may be utilized as the anode of a power tube of the thyratron or ignitron type. Such coated anodes extend the life expectancy of the tube and, of course, prevent the release of adsorbed gases from the anode.

There has thus been disclosed a novel process for infiltrating and coating a porous substrate with pyrolytic graphite in such a way as to create a transition zone between the substrate and the coating. This will prevent peeling or flaking off of the coating. Such coated articles may be used for certain applications explained herein.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and we do not wish to be restricted to the specific form shown or uses mentioned except as defined in the accompanying claims, wherein various portions have been separated for clarity of reading and not for emphasis.

We claim:

1. A process of forming a coated article having a substrate with pyrolytic graphite coating tightly secured thereto, said substrate consisting of a porous material capable of withstanding a temperature of at least 1900° C., said process comprising the steps of:
    (a) heating said substrate to a temperature of between approximately 900° C. and approximately 1350° C.;
    (b) flowing methane over said substrate and into the voids thereof for a period of time sufficient to infiltrate said substrate with pyrolytic graphite and to seal the voids therein;
    (c) raising the temperature of said substrate to between approximately 1500° C. and approximately 1900° C. while continuing the flow of methane; and
    (d) continuing the flow of methane over said substrate while at the increased temperature for a period of time sufficient to provide a uniform coating of pyrolytic graphite over the infiltrated substrate.

2. A process of forming a coated article having a substrate with pyrolytic graphite, said substrate consisting of a porous material capable of withstanding a temperature of at least 1900° C., said process comprising the steps of:
    (a) heating said substrate to a temperature of between approximately 900° C. and approximately 1350° C. at a pressure of 0.5 mm. to about 350 mm. of mercury;
    (b) flowing methane around said substrate at a flow of about 0.1 cubic foot per hour to about 150 cubic feet per hour and for a period of time from about one-half hour to about two days to infiltrate carbon into the voids of said substrate and to seal the voids therein;
    (c) increasing the temperature of said substrate to between approximately 1500° C. and approximately 1900° C. while continuing the flow of methane; and
    (d) continuing the flow of methane over said substrate while at the increased temperature at about 0.1 cubic foot per hour to about 150 cubic feet per hour and at a pressure of about 0.5 mm. to 350 mm. of mercury for a period of time of about one-quarter hour to about one-half day to provide said substrate with a coating of pyrolytic graphite which is bonded to said infiltrated substrate.

3. A process as defined in claim 2 in which the material deposited during the raising of the temperature provides a transition zone between the carbon infiltrated into the voids and the pyrolytic graphite coating.

4. A pyrolytic graphite coated article having a substrate consisting of porous material capable of withstanding a temperature of at least 1900° C. produced by the method which comprises the steps of:
    (a) heating said substrate to a temperature of between approximately 900° C. and approximately 1350° C.;
    (b) flowing methane over said substrate and into the voids thereof for a period of time sufficient to infiltrate said substrate with pyrolytic graphite and to seal the voids therein;
    (c) raising the temperature of said substrate to between approximately 1500° C. and approximately 1900° C. while continuing the flow of methane; and
    (d) continuing the flow of methane over said substrate while at the increased temperature for a period of time sufficient to provide a uniform coating of pyrolytic graphite over the infiltrated substrate.

5. A pyrolytic graphite coated article having a substrate consisting of porous material capable of withstanding a temperature of at least 1900° C. produced by the method which comprises the steps of:
    (a) heating said substrate to a temperature of between approximately 900° C. and approximately 1350° C. at a pressure of 0.5 mm. to about 350 mm. of mercury;
    (b) flowing methane around said substrate at a flow of about 0.1 cubic foot per hour to about 150 cubic feet per hour and for a period of time from about one-half hour to about two days to infiltrate carbon into the voids of said substrate and to seal the voids therein;
    (c) increasing the temperature of said substrate to between approximately 1500° C. and approximately 1900° C. while continuing the flow of methane; and
    (d) continuing the flow of methane over said substrate while at the increased temperature at about 0.1 cubic foot per hour to about 150 cubic feet per hour and at a pressure of about 0.5 mm. to 350 mm. of mercury for a period of time of about one-quarter hour to about one-half day to provide said substrate with a coating of pyrolytic graphite which is bonded to said infiltrated substrate.

References Cited
UNITED STATES PATENTS

| | | | |
|---|---|---|---|
| 2,062,370 | 12/1936 | Miller | 117—46 CG X |
| 2,282,235 | 5/1942 | Moberly | 117—46 CG X |
| 2,789,038 | 4/1957 | Bennett et al. | 117—46 CG X |
| 3,107,180 | 10/1963 | Diefendorf | 117—46 CG X |
| 3,206,331 | 9/1965 | Diefendorf | 117—226 |
| 3,317,338 | 5/1967 | Batchelor | 117—46 CG |

ALFRED L. LEAVITT, Primary Examiner

K. P. GLYNN, Assistant Examiner

U.S. Cl. X.R.

23—209.1 P; 117—106 C, 226; 264—29